(12) United States Patent
Morishita et al.

(10) Patent No.: US 7,206,056 B2
(45) Date of Patent: Apr. 17, 2007

(54) DISPLAY DEVICE HAVING A TERMINAL THAT HAS A TRANSPARENT FILM ON TOP OF A HIGH RESISTANCE CONDUCTIVE FILM

(75) Inventors: Hitoshi Morishita, Kumamoto (JP); Hiroshi Ueda, Kumamoto (JP); Hirofumi Iwanaga, Kumamoto (JP); Shigeaki Noumi, Kumamoto (JP); Takehisa Yamaguchi, Kumamoto (JP)

(73) Assignee: Advanced Display Inc., Kumamoto (JP)

( * ) Notice: Subject to any disclaimer, the term of this patent is extended or adjusted under 35 U.S.C. 154(b) by 37 days.

(21) Appl. No.: 10/821,885

(22) Filed: Apr. 12, 2004

(65) Prior Publication Data

US 2004/0207796 A1    Oct. 21, 2004

(30) Foreign Application Priority Data

Apr. 18, 2003   (JP) .............................. 2003-114004

(51) Int. Cl.
*G02F 1/1345* (2006.01)
(52) U.S. Cl. ...................... 349/152; 349/151; 349/147
(58) Field of Classification Search ................ 349/152
See application file for complete search history.

(56) References Cited

U.S. PATENT DOCUMENTS 5,726,726 A    3/1998  Nakanishi
5,748,179 A *  5/1998  Ito et al. ..................... 349/152
5,808,595 A    9/1998  Kubota et al.
5,818,561 A * 10/1998  Nakanishi ................... 349/149
6,111,628 A *  8/2000  Shiota et al. ................ 349/150

FOREIGN PATENT DOCUMENTS

| JP | 7-159804   | 6/1995 |
| JP | 9-80456    | 3/1997 |
| JP | 9-152621   | 6/1997 |
| JP | 10-133216  | 5/1998 |
| JP | 11-52405   | 2/1999 |
| JP | 2000-89685 | 3/2000 |
| JP | 2002-134851| 5/2002 |
| JP | 2002-244151| 8/2002 |
| TW | 526375     | 4/2003 |

* cited by examiner

*Primary Examiner*—Andrew Schechter
*Assistant Examiner*—Lucy Chien
(74) *Attorney, Agent, or Firm*—Oblon, Spivak, McClelland, Maier & Neustadt, P.C.

(57) ABSTRACT

The display device includes the lead line connected to pixels, the line terminal connected to the lead line and connected to the terminal of the drive circuit mounted directly on the insulating substrate by the conductive material through the transparent conductive film, the external terminal to be connected to an external unit, an external line connected to the external terminal, and an external line terminal connected to the external line and connected directly to the terminal of the drive circuit by the conductive material. The surface of the line terminal to be connected to the transparent conductive film is formed by the high resistance conductive film, and the surface of the external line terminal to be connected to the terminal of the drive circuit by the conductive material is formed by the low resistance conductive film.

19 Claims, 5 Drawing Sheets

DISPLAY DEVICE HAVING A TERMINAL THAT HAS A TRANSPARENT FILM ON TOP OF A HIGH RESISTANCE CONDUCTIVE FILM

BACKGROUND OF THE INVENTION

1. Field of the Invention

The present invention relates to a display device with enhanced connection reliability between terminals on the insulating substrate and a drive circuit directly mounted thereon, and a method of manufacturing the display device, which are particularly effective in application to liquid crystal display devices.

2. Description of the Related Art

One advanced application that has been developed as a low-cost manufacturing method of display devices, such as liquid crystal display devices, is Chip-On-Grass (COG), in which a drive circuit is mounted directly on an insulating substrate. This technique directly attaches a drive circuit where Au bumps are created to terminals formed on the periphery of an insulating substrate with a conductive material such as an anisotropic conductive film (ACF). When using this technique, a power line and signal lines for driving the drive circuit are connected to the terminals (bumps) formed on the drive circuit through the ACF. Since a number of bumps are formed on the drive circuit with small pitch, the pitch of the power line or the signal lines formed on the insulating substrate is narrowed accordingly. This increases line resistance and causes defects such as malfunction of the drive circuit.

One technique for solving the above problem in conventional COG display devices is disclosed in Japanese Unexamined Patent Application Publication 11-52405 and illustrated in FIG. 2, for example. This technique covers line parts on a cell of a display element with metallic plating and/or vapor deposition. The electrical junction to a glass substrate is not covered with the metallic plating and/or vapor deposition, thereby allowing the observation of the connections to the glass substrate. Since the metallic plating and/or the vapor deposition are performed only on a power source line and a ground line to a drive circuit and a pressurizing line, it is able to reduce the resistance to the lines.

Another conventional technique is disclosed in Japanese Unexamined Patent Application Publication 2002-244151 and illustrated in FIG. 9, for example. This technique forms a plurality of terminals on a substrate and covers the terminals with a protective film having pad contact holes corresponding to the terminals. With the protective film having the pads for connection with a drive circuit, it is able to achieve good contact characteristics.

Though the above conventional techniques provide the structures of display devices with a drive circuit mounted directly on the terminals of an insulating substrate, they do not provide the structure for suppressing the increase in contact resistance due to the material of the lines and terminals of the insulating substrate. When mounting the drive circuit on the insulating substrate by the COG technique, it is difficult to form large line patterns of the power line and signal lines in the area where the drive circuit is mounted for resistance reduction, as described above. Particularly, since the power line and the signal lines transmit, to the drive circuit, input signals supplied from outside through a flexible circuit substrate and the lines and terminals on the insulating substrate, their resistance should be low. Otherwise, it causes low voltage supply capacity or voltage drop in the power line, delay in the signal lines, and so on, which leads to malfunction of the drive circuit. To prevent this, a conductive film with relatively low resistance, such as Al, is used as the material of these lines. On the other hand, lines connected to the lines in a display area of the insulating substrate where pixels are to be formed do not necessarily have such a low resistance. Thus, a conductive film with relatively high resistance, such as Cr, is used as the material of the lines.

In the case of connecting the terminal of the drive circuit and the terminal of the insulating substrate through a conductive material such as ACF, the terminal of the insulating substrate is often formed with a transparent conductive film connected to a metal material of the lines. The power line and the signal lines extending from the external flexible circuit substrate through the lines and terminals on the insulating substrate to the drive circuit are made of a low resistance material such as Al as described above. Thus, the contact resistance undesirably increases between the transparent conductive film made of Indium Tim Oxide, (ITO), $SnO_2$, and so on and the low resistance material such as Al.

SUMMARY OF THE INVENTION

In view of the foregoing, it is an object of the present invention to provide a secure electrical connection between the drive circuit and the terminals on the insulating substrate in the display device with the drive circuit mounted directly on an insulating substrate, thereby enhancing connection reliability.

To these ends, according to one aspect of the present invention, there is provided a display device including lines connected to pixels formed on an insulating substrate; a lead line connected to at least one of the lines in a peripheral area of the insulating substrate different from a display area comprising the pixels; a line terminal connected to at least one of the lead line and connected to a terminal of a drive circuit mounted directly in the peripheral area of the insulating substrate by a conductive material through a transparent conductive film; an external terminal formed on a periphery of the peripheral area of the insulating substrate, to be connected to an external unit; an external line connected to at least one of the external terminal; and an external line terminal connected to at least one of the external line and connected directly to a terminal of the drive circuit by a conductive material, wherein a surface of the line terminal to be connected to the transparent conductive film is formed by a high resistance conductive film, and a surface of the external line terminal to be connected to the terminal of the drive circuit by the conductive material is formed by a low resistance conductive film. This structure can enhance connection reliability between the terminals of the drive circuit and the terminals on the insulating substrate without increasing contact resistance.

In this display device, the high resistance conductive film may be Cr, Ti, Ta, Mo, W, Ni, an alloy of those metals, or a laminated film of those metals. The low resistance conductive film may be Al, Cu, Au, Ag, an alloy of those metals, or a laminated film of those metals. The low resistance conductive film is preferably Al or an alloy of Al.

The external line and the external line terminal are preferably formed by the same layer of a conductive film as a scan line for driving the pixels. Further, the lead line and the line terminal are preferably formed by the same layer of a conductive film as a signal line crossing a scan line for driving the pixels through an insulating film. The transparent conductive film is preferably formed by the same layer of a conductive film as a pixel electrode of the pixel.

A terminal of the drive circuit and a terminal of an adjacent drive circuit are preferably connected to each other in such a way that each of the terminals is directly connected to the low resistance conductive film by a conductive material in a near proximity to each of sides of the drive circuits facing each other. Terminal of the drive circuit connected to the line terminal through the transparent conductive film may be formed in a near proximity to a side of the drive circuit close to the display area.

The external terminal may be formed in an area between the drive circuit and the adjacent drive circuit.

The external terminal is preferably connected directly to an external unit by a conductive material formed in the same step as the conductive material used for connecting the terminals of the drive circuit mounted directly in the insulating substrate to the line terminal and to the external line terminal.

It is preferred that the terminal of the drive circuit connected to the line terminal by the conductive material through the transparent conductive film and the terminal of the drive circuit connected directly to the external line terminal by the conductive material have a difference in height, which is substantially equal to a difference in height of the transparent conductive film on the line terminal, and the external line terminal, formed above the insulating substrate and connected respectively to the terminals of the drive circuit.

According to another aspect of the present invention, there is provided a method of manufacturing a display device including lines connected to pixels formed on an insulating substrate, a lead line connected to at least one of the lines in a peripheral area of the insulating substrate different from a display area comprising the pixels, an external terminal formed on a periphery of the peripheral area of the insulating substrate, to be connected to an external unit, and an external line connected to at least one of the external terminal, having the steps of forming a line terminal connected to at least one of the lead line in the peripheral area of the insulating substrate by depositing and patterning a high resistance conductive film; forming an external line terminal connected to at least one of the external line by depositing and patterning a low resistance conductive film; connecting the line terminal and a terminal of a drive circuit directly mounted in the insulating substrate by a conductive material through a transparent conductive film; and connecting the external line terminal and a terminal of the drive circuit directly by a conductive material. This method can enhance connection reliability between the terminals of the drive circuit and the terminals on the insulating substrate without increasing contact resistance.

In this method, the high resistance conductive film may be Cr, Ti, Ta, Mo, W, Ni, an alloy of those metals, or a laminated film of those metals. The low resistance conductive film may be Al, Cu, Au, Ag, an alloy of those metals, or a laminated film of those metals. The low resistance conductive film is preferably Al or an alloy of Al.

The external line and the external line terminal are preferably formed in the same step as forming a scan line for driving the pixels. Further, the lead line and the line terminal are preferably formed in the same step as forming a signal line crossing a scan line for driving the pixels through an insulating film. The transparent conductive film is preferably formed in the same step as forming a pixel electrode of the pixel.

The above method of manufacturing a display device may further comprises a step of connecting a terminal of the drive circuit and a terminal of an adjacent drive circuit in such a way that each of the terminals is directly connected to the low resistance conductive film by a conductive material in a near proximity to each of sides of the drive circuits facing each other.

The external terminal is preferably connected directly to an external unit by a conductive material formed in the same step as the conductive material used for connecting the terminals of the drive circuit mounted directly in the insulating substrate to the line terminal and to the external line terminal.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Embodiment 1

Figure 1:
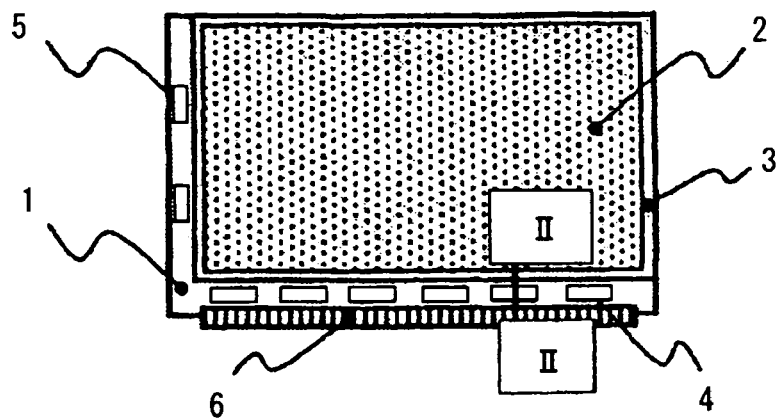
FIG. 1 is a plan view of a display device according to the first embodiment of the present invention.
Figure 2:
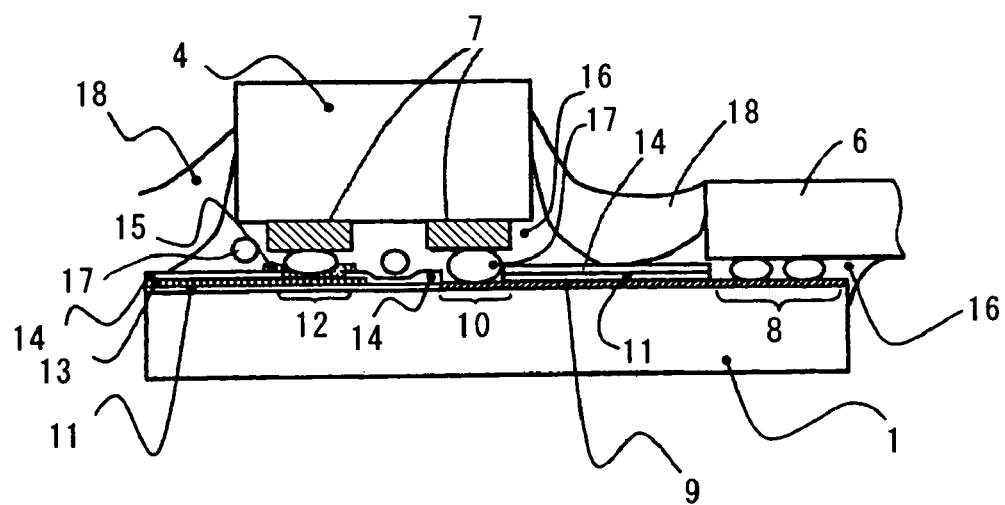
FIG. 2 is a cross-sectional view along line II—II in FIG. 1.

The first embodiment of the present invention will be explained hereinafter with reference to FIGS. 1 and 2. FIG. 1 is a plan view of a display device according to the first embodiment of this invention and FIG. 2 is a cross-sectional view along line II—II in FIG. 1. As shown in FIG. 1, the display device has an insulating substrate 1 having a display area 2 consisting of pixels. A color filter substrate 3, which serves as a counter substrate, is placed face to face with the insulating substrate 1 with liquid crystal interposed therebetween. On the peripheral area of the insulating substrate 1 outside of the display area are mounted a signal line drive circuit 4 comprising the lines to be connected to the pixels and connected to signal lines for supplying signals and a scan line drive circuit 5 comprising the lines connected to the pixels for driving the pixels. Further, a flexible substrate 6 is attached to the periphery of the insulating substrate 1 so as to supply power or input signals to the drive circuits 4 and 5 from outside of the insulating substrate 1.

Now, the method of manufacturing the display device according to the present invention will be explained hereinafter with reference to FIG. 2. FIG. 2 is a cross-sectional view along line II—II of FIG. 1. On the insulating substrate 1 made of a glass, for example, a low resistance conductive film made of Al, Cu, Au, or Ag, an alloy of those metals, or a laminated film of those metals is deposited by sputtering and so on. The film is then patterned by photolithography and the like. A scan line to be connected to a gate electrode of a thin film transistor is thereby formed. Also formed are an external terminal 8 and an external line 9 to be connected to the flexible substrate 6 for supplying power and signals from outside to the insulating substrate 1, and an external line terminal 10 to be connected directly to a terminal 7 of the signal line drive circuit 4 with a conductive material, as described later. The external line terminal 10, the external line 9, and the external terminal 8, including the surface of the external line terminal 10 to be connected directly to the terminal 7 of the signal line drive circuit 4 by the conductive material, are formed by the same layer of the flow resistance conductive film.

An insulating film 11 made of SiN and so on is then formed. After that, a high resistance conductive film made of Cr, Ti, Ta, Mo, W, or Ni, an alloy of those metals, or a laminated film of those metals is deposited by sputtering and so on. The film is then patterned by photolithography and the like. A signal line to be connected to a source electrode or a drain electrode is thereby formed. Also formed are a line terminal 12 to be connected to the terminal 7 of the signal line drive circuit 4 through a transparent conductive film by a conductive material, as described later, and a lead line 13 to be connected to the lines connected to the pixels in the display area. The line terminal 12 and the lead line 13, including the surface of the line terminal 12 to be connected to the transparent conductive film, are formed by the same layer of the high resistance conductive film.

Then, a protective film 14 made of SiN and so on is formed. Further, a pixel electrode constituting the pixel in the display area is formed; at the same time, a transparent conductive film 15 made of ITO, $SnO_2$, and so on is formed above the line terminal 12. As described above, the external terminal 8, the external line 9, and the external line terminal 10 are formed by the low resistance conductive film. If Al, Cu, Au, or Ag, an alloy of those metals, or a laminated film of those metals is used for the low resistance conductive film, when connecting those with the terminal 7 of the signal line drive circuit 4 by a conductive material 16 through the transparent conductive film made of ITO, $SnO_2$, and so on, the contact resistance increases, failing to obtain good connection characteristics. Hence, the transparent conductive film 15 is not formed above the external line terminal 10. The pattern for connection with the terminals 7 of the signal line drive circuit 4 is thereby formed on the insulating substrate 1.

The high resistance conductive film in this specification refers to a metal material used for the line having a relatively high specific resistance, for example, 5 $\mu\Omega$ cm or above. The low resistance conductive film, on the other hand, refers to a metal material used for the line having a relatively low specific resistance, for example, less than 5 $\mu\Omega$ cm. An alloy including the above metal or a laminated film of the above metal is also referred to as the high resistance conductive film if the specific resistance is 5 $\mu\Omega$ cm or above, and the low resistance conductive film if the specific resistance is less than 5 $\mu\Omega$ cm.

In the following, the process of mounting the drive circuit will be explained with reference to FIG. 2. Firstly, a conductive material 16 made of ACF and so on is deposited to cover the external terminal 8, the external line terminal 10, and the line terminal 12. The conductive material 16 is made up of a conductive particle 17 and an insulating epoxy resin. Then, the flexible substrate 6 placed outside of the insulating substrate 1 is attached to the external terminal 8 on the periphery of the insulating substrate 1. The terminals 7 of the signal line drive circuit 4 are each accurately aligned with and then thermocompression-bonded to the line terminal 12 and the external line terminal 10, respectively. Normal conditions of the thermocompression bonding are: the maximum temperature of the conductive material of 170 to 200° C., the thermocompression bonding time of 5 to 19 seconds, and the pressure of 30 to 100 MPa. By the thermocompression bonding under these conditions, the conductive particles 17 in the conductive material 16 placed between the terminals 7 of the signal line drive circuit 4 and the line terminal 12 and the external line terminal 10 are flattened, as shown in FIG. 2, and become vertically conductive but remain horizontally insulative due to the insulating epoxy resin. After that, a moisture-resistant coating resin 18 is deposited with a dispenser around the signal line drive circuit 4 and over the connecting area of the flexible substrate 6. As described above, the transparent conductive film 15 is formed above the line terminal 12, but not above the external line terminal 10, and the external line terminal 10 is connected directly to the terminal 7 of the signal line drive circuit 4 by the conductive material 16.

This structure can prevent the increase in contact resistance that occurs when the external line terminal, formed by the low resistance conductive film, to input various signals is connected to the terminal of the drive circuit by the conductive material through the transparent conductive film. It is thus able to achieve a good electrical connection between the terminal of the drive circuit and the terminal on the insulating substrate. In this structure, the line terminal on the insulating substrate, formed by the high resistance conductive film, to transmit various signals from the terminal of the drive circuit to the pixel of the display area, is connected to the terminal of the drive circuit by the conductive material through the transparent conductive film, thereby also preventing the increase in contact resistance. Consequently, it enables a secure electrical connection between the terminals of the drive circuit and the terminals on the insulating substrate without increasing contact resistance, thus enhancing connection reliability. Though the low resistance conductive film may be made of any of Al, Cu, Au, or Ag, an alloy of those metals, or a laminated film of those metals to obtain the above effect, it is preferred to use Al or an alloy of Al for its high corrosion resistance in the manufacturing process.

Embodiment 2

Figure 3:
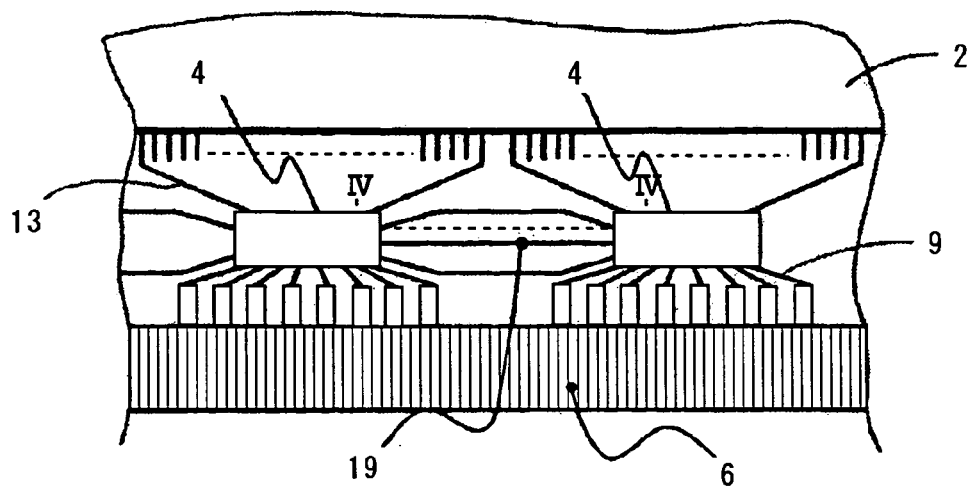
FIG. 3 is a plan view of a drive circuit mounting area of a display device according to the second embodiment of the present invention.
Figure 4:
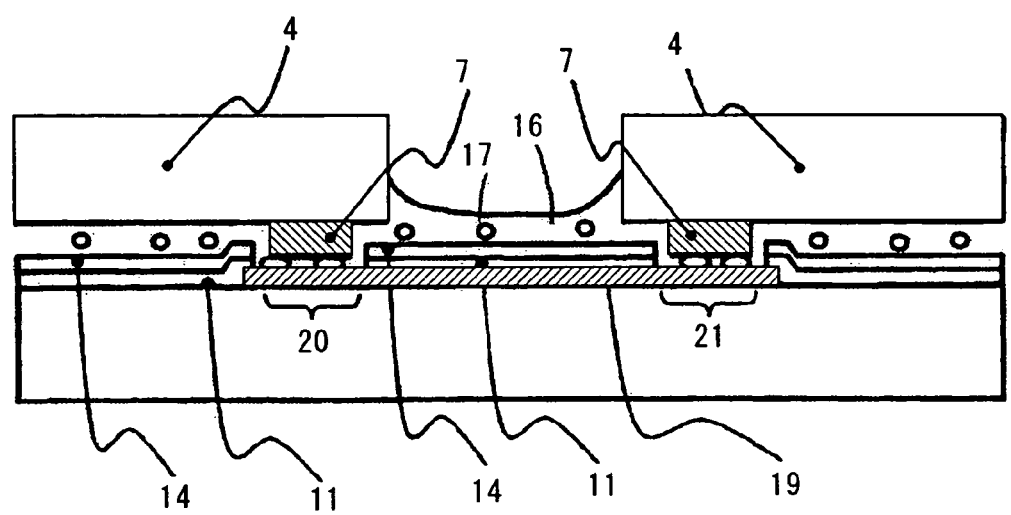
FIG. 4 is a cross-sectional view along line IV—IV in FIG. 3.

The second embodiment of the present invention will be explained herein after with reference to FIGS. 3 and 4. FIG. 3 is a plan view of a drive circuit mounting area of a display device according to the second embodiment of the present invention and FIG. 4 is a cross-sectional view along line IV—IV in FIG. 3. In FIGS. 3 and 4, the same elements as in FIGS. 1 and 2 are denoted by the same reference symbols, and the explanation will be given on the differences. FIGS.

3 and 4 illustrate the adjacent two drive circuits 4. The drive circuits 4 are connected by a drive circuit connecting line 19 connecting between the terminals formed at the sides of the two drive circuits 4 facing each other. If a signal is supplied from the signal line drive circuit 4 in the left to that in the right in FIG. 4, for example, the terminals 7 of the signal line drive circuit 4 are connected to the terminal 20 for supplying a signal and to the terminal 21 for receiving the signal, both formed on the insulating substrate 1, by the conductive material 16 without through the transparent film. It is thus able to prevent the increase in contact resistance, particularly when the drive circuit connecting line 19 is formed by a low resistance conductive film, achieving high connection reliability.

It is preferred that the supply terminal 20 and the receive terminal 21 are placed on the insulating substrate 1 at the positions corresponding to the sides of the drive circuits 4 facing each other, as shown in FIG. 3, so as to shorten the drive circuit connecting line 19 and reduce resistance and a line area. The terminals, however, may be placed at any position on the insulating substrate 1, as long as it is close to the two facing sides of the drive circuits 4. For example, the supply terminal 20 and/or the receive terminal 21 may be placed at the side close to the display area, as in the third embodiment and illustrated in FIG. 6, described later. Further, it is also preferred that the drive circuit connecting line 19 is formed in the same step as forming the scan line in order to reduce manufacturing steps.

Embodiment 3

Figure 5:
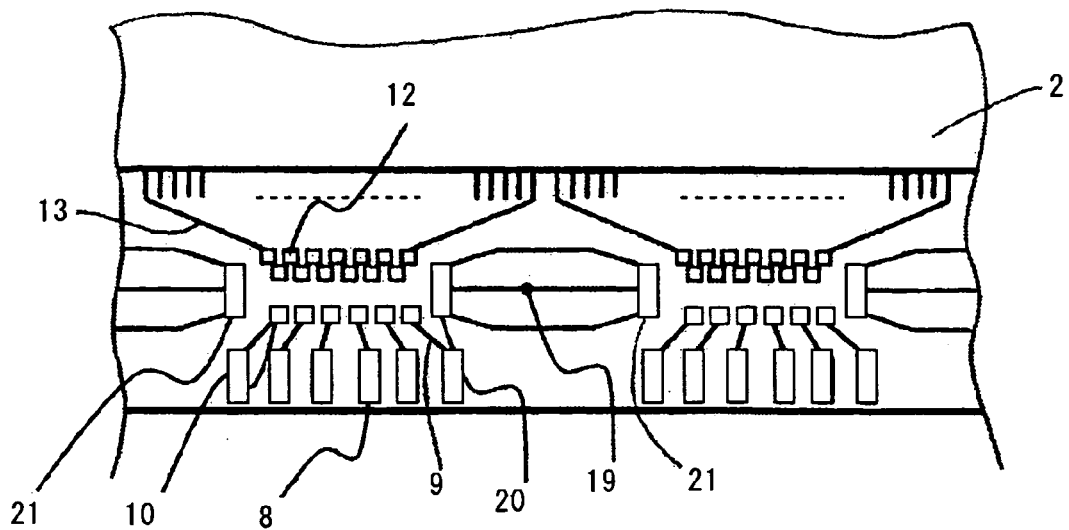
FIG. 5 is a plan view of a drive circuit mounting area of a display device before a drive circuit is mounted according to the third embodiment of the present invention.
Figure 6:
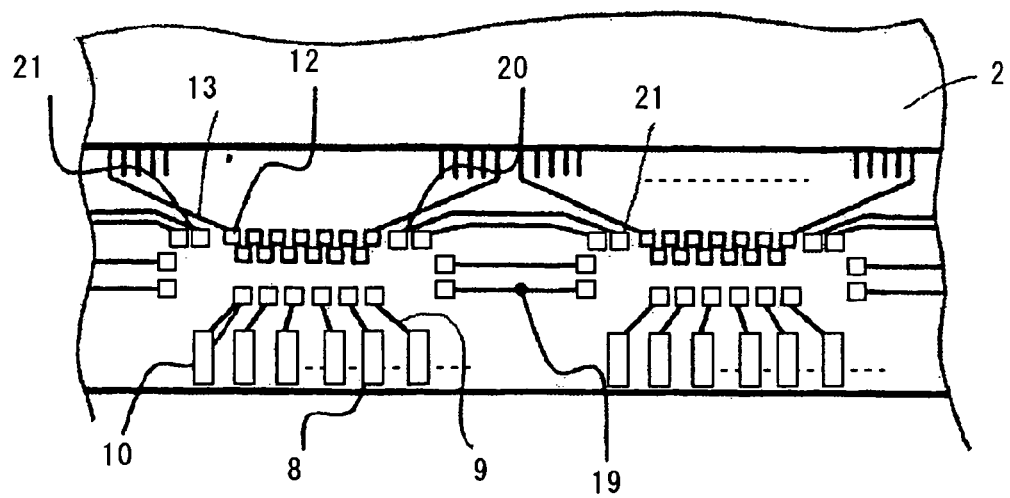
FIG. 6 is a plan view of a drive circuit mounting area of another display device before a drive circuit is mounted according to the third embodiment of the present invention.

The third embodiment of the present invention will be explained hereinafter with reference to FIGS. 5 and 6. FIG. 5 is a plan view of a drive circuit mounting area of a display device before a drive circuit is mounted, according to the third embodiment of this invention. FIG. 6 is a plan view of a drive circuit mounting area of another display device before a drive circuit is mounted, according to the third embodiment of this invention. In FIGS. 5 and 6, the same elements as in FIG. 1 to 4 are denoted by the same reference symbols, and the explanation will be given on the differences. FIG. 5 shows the terminals on the insulating substrate before the drive circuit is mounted. In this embodiment, the line terminals 12 to be connected to the lead lines 13 connected to the pixels of the display area 2 are formed in the drive circuit mounting area of the insulating substrate 1 along the side adjacent to the display area 2. Two lines of the line terminals 12 are formed in this example.

This structure enables effective patterning of the line to be connected to the pixel in the display area, the line to connect the adjacent drive circuits, and the line to input power and signals from outside to the drive circuit without any redundancy, thereby preventing the increase in line resistance. As described in the first and second embodiments, the line connecting the adjacent drive circuits and the line to input signals from outside to the drive circuit, which are formed by the low resistance conductive film, are connected to the terminals of the drive circuit by the conductive material without through the transparent conductive film, thereby achieving low resistance. Further, the line connected to the pixel in the display area, which is formed by a high resistance conductive film, is connected to the terminal of the drive circuit by the conductive material through the transparent conductive film, thereby also achieving low resistance. The supply terminal 20 and the receive terminal 21 formed on the insulating substrate 1 and connected by the drive circuit connecting line 19 between the adjacent drive circuits may be placed at the positions corresponding to the facing sides of the adjacent circuits as shown in FIG. 5. Alternatively, the terminals 20 and/or 21 may be placed at the position corresponding to the side of the drive circuit close to the display area as shown in FIG. 6. The obtained effect is the same in either case.

Embodiment 4

Figure 7:
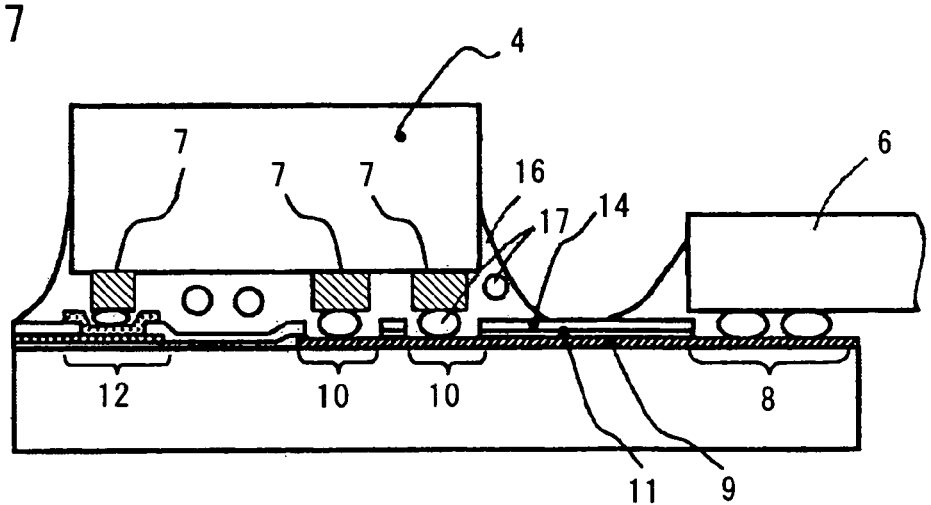
FIG. 7 is a cross-sectional view of a drive circuit mounting area of a display device according to the fourth embodiment of the present invention.

The fourth embodiment of the present invention will be explained hereinafter with reference to FIG. 7. FIG. 7 is a cross-sectional view of a drive circuit mounting area of a display device according to the fourth embodiment of this invention. In FIG. 7, the same elements as in FIG. 1 to 6 are denoted by the same reference symbols, and the explanation will be given on the differences. In this embodiment, two external line terminals 10 connected to the external line 9 for supplying power from outside to the drive circuit are each connected to the terminal 7 of the signal line drive circuit 4. Between and around the external line terminals 10 are the insulating film 11 and the protective film 14. This structure can prevent the increase in contact resistance due to contamination on the terminal surface, which occurs if a plurality of terminals of the drive circuit are connected to a single large terminal on the insulating substrate when inputting power from outside to the drive circuit. It is thereby able to enhance connection reliability.

Embodiment 5

Figure 8:
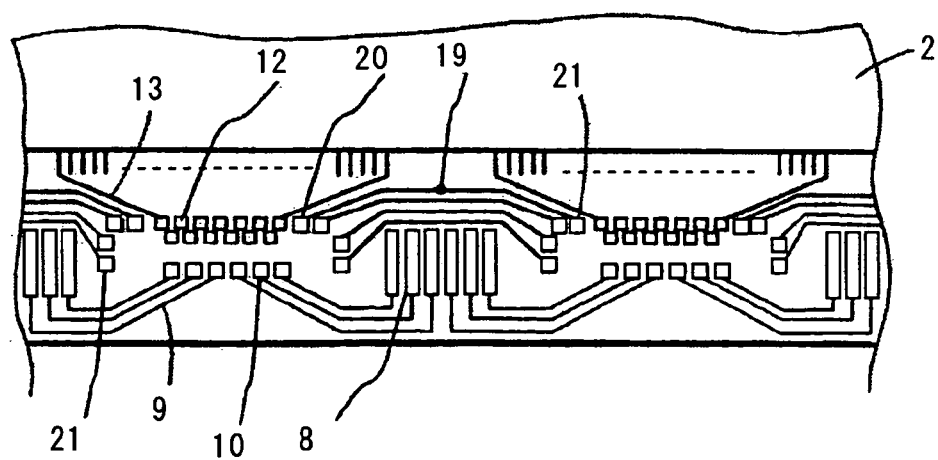
FIG. 8 is a plan view of a drive circuit mounting area of a display device before a drive circuit is mounted according to the fifth embodiment of the present invention.

The fifth embodiment of the present invention will be explained with reference to FIG. 8. FIG. 8 is a plan view of a drive circuit mounting area of a display device before a drive circuit is mounted, according to the fifth embodiment of the present invention. In FIG. 8, the same elements as in FIG. 1 to 7 are denoted by the same reference symbols, and the explanation will be given on the differences. In this embodiment, at least parts of the external terminals 8 connected to the external flexible substrate are placed between the adjacent drive circuits. This structure can reduce the peripheral area outside the display area of the display device, enabling down sizing of the device.

Embodiment 6

Figure 9:
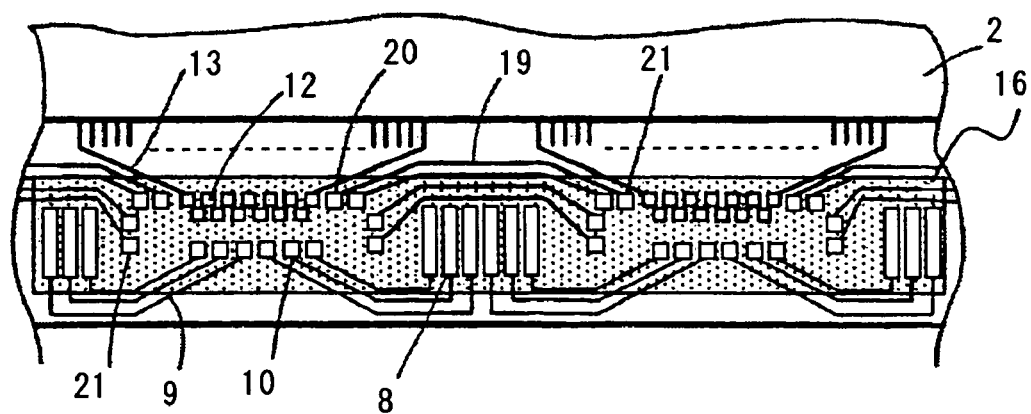
FIG. 9 is a plan view of a drive circuit mounting area of a display device before a drive circuit is mounted according to the sixth embodiment of the present invention.

The sixth embodiment of the present invention will be explained with reference to FIG. 9. FIG. 9 is a plan view of a drive circuit mounting area of a display device before a drive circuit is mounted, according to the sixth embodiment of this invention. In FIG. 9, the same elements as in FIG. 1 to 8 are denoted by the same reference symbols, and the explanation will be given on the differences. In this embodiment, after the patterning of the lines and terminals on the insulating substrate, the conductive material 16 made of ACF and so on to cover the external terminal 8 to be connected to the external flexible substrate, the external line terminal 10 to be connected to the external line 9 connected to the external terminal 8, and the line terminal 12 to be connected to the lead line 13 connected to the pixel of the display area 2 is deposited in one deposition step. By completing the deposition of the conductive material 16 in one step, manufacturing steps can be reduced.

Embodiment 7

Figure 10:
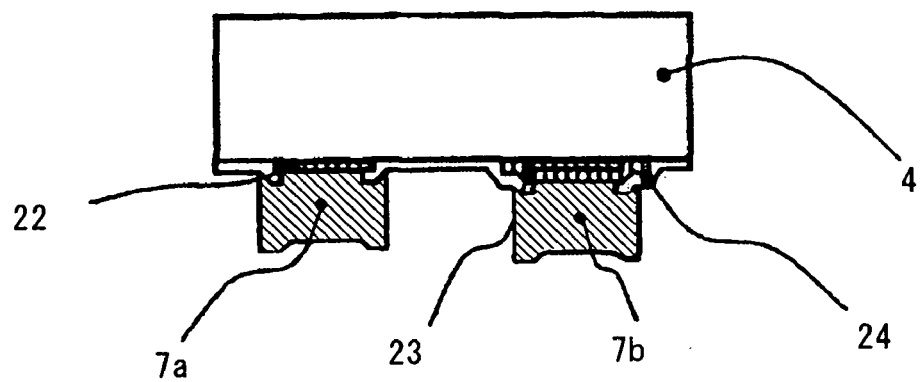
FIG. 10 is a cross-sectional view of a drive circuit according to the seventh embodiment of the present invention.

The seventh embodiment of the present invention will be explained hereinafter with reference to FIG. 10. FIG. 10 is a cross-sectional view of a drive circuit according to the seventh embodiment of this invention. In FIG. 10, the same elements as in FIG. 1 to 9 are denoted by the same reference symbols, and the explanation will be given on the differences. In this embodiment, the height of the terminal of the drive circuit which is connected to the terminal on the insulating substrate formed by the high resistance conductive film by the conductive material through the transparent conductive film is made to be relatively low, such as an output terminal 7a of the drive circuit 4. On the other hand, the height of the terminal of the drive circuit which is connected to the terminal on the insulating substrate formed by the low resistance conductive film by the conductive material without through the transparent conductive film is made to be relatively high, such as an input terminal 7b of the drive circuit 4. A process of forming the terminals of the signal line drive circuit 4 shown in FIG. 10 is as follows. Firstly, first aluminum electrodes 22 are formed on the drive circuit in the positions to place the output terminal 7a and the input terminal 7b. Then, a second aluminum electrode 23 is formed in the position to place the input terminal 7b, the one to be formed higher. Adjusting the thickness of the second aluminum electrode 23 allows adjusting the height difference of the output terminal 7a and the input terminal 7b. Finally, a protective insulating film 24 is formed around the output terminal 7a and the input terminal 7b.

It is preferred that the difference in height of the output terminal 7a and the input terminal 7b is substantially equal to a difference in height of the terminal of the insulating substrate connected the output terminal 7a and the terminal of the insulating substrate connected to the input terminal 7b. Specifically, in the terminal structure in FIG. 2, for example, the line terminal 12 to be connected to the lead line 13 connected to the pixel of the display area is connected to the terminal 7 of the signal line drive circuit 4 by the conductive material through the transparent conductive film 15. On the other hand, the external line terminal 10 to be connected to the external line 9 for inputting a signal from outside is connected to the terminal 7 of the signal line drive circuit 4 by the conductive material without through the transparent conductive film 15. Thus, the height difference of the two terminals 7 of the drive circuit 4 is preferably 0.5 to 1 μm, which is the thickness of the transparent conductive film 15 plus the thickness of the insulating film 11 placed below the line terminal 12. This structure can prevent faulty thermocompression bonding or faulty electrical connection which occurs if the drive circuit 4 is inclined when mounted on the insulating substrate 1. It is thus able to enhance connection reliability.

The first to seventh embodiments of this invention explained in the foregoing may be used in combination to produce each effect. Further, though the signal line drive circuit for supplying signals to the pixels in the display area is mainly explained as the drive circuit in the above first to seventh embodiments, the same structure as in the above embodiments may be applied to the scan line drive circuit for driving the pixels if the lead lines connected to the lines to be connected to the pixels in the display area are formed by the high resistance conductive film just like the lead lines connected to the terminals of the signal line drive circuit. Furthermore, this invention is not limited to the structure of layers or the order of lamination described in the first to seventh embodiments, and it is applicable to any display device having a drive circuit mounted directly on the terminals of an insulating substrate and provided with low resistance lines.

Though the first to seventh embodiments are described in conjunction with the liquid crystal display devices, the present invention is not limited thereto, and it may be applied to electroluminescence display devices or any other display devices in which a drive circuit is mounted directly on the terminals of an insulating substrate.

The present invention enables a secure electrical connection between the terminals of the drive circuit and the terminals on the insulating substrate without increasing contact resistance, thereby enhancing connection reliability.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A display device comprising:
   lines connected to pixels formed on an insulating substrate;
   a lead line connected to at least one of the lines in a peripheral area of the insulating substrate different from a display area comprising the pixels;
   a line terminal connected to at least one of the lead line in a peripheral area of the insulating substrate different from a display area;
   a transparent conductive film provided on the line terminal;
   an anisotropic conductive material provided on the transparent conductive film;
   a driver circuit with a terminal connected to the line terminal through the transparent film;
   an external terminal formed on a periphery of the peripheral area of the insulating substrate, to be connected to an external unit;
   an external line connected to at least one of the external terminal; and
   an external line terminal connected to at least one of the external line and connected directly to a terminal of the drive circuit by the anisotropic conductive material,
   wherein a surface of the line terminal to be connected to the transparent conductive film is formed by a high resistance conductive film, and a surface of the external line terminal to be connected to the terminal of the drive circuit by the anisotropic conductive material is formed by a low resistance conductive film.

2. A display device according to claim 1, wherein the high resistance conductive film is a selected one of Cr, Ti, Ta, Mo, W, Ni, an alloy of those metals, and a laminated film of those metals, and the low resistance conductive film is a selected one of Al, Cu, Au, Ag, an alloy of those metals, and a laminated film of those metals.

3. A display device according to claim 1, wherein the high resistance conductive film is a selected one of Cr, Ti, Ta, Mo, W, Ni, an alloy of those metals, and a laminated film of those metals, and the low resistance conductive film is a selected one of Al and an alloy of Al.

4. A display device according to claim 1, wherein the external line and the external line terminal are formed by the same layer of a conductive film as a scan line for driving the pixels.

5. A display device according to claim 1, wherein the lead line and the line terminal are formed by the same layer of a conductive film as a signal line crossing a scan line for driving the pixels through an insulating film.

6. A display device according to claim 1, wherein the transparent conductive film is formed by the same layer of a conductive film as a pixel electrode of the pixel.

7. A display device according to claim 1, wherein a terminal of the drive circuit and a terminal of an adjacent drive circuit are connected to each other in such a way that each of the terminals is directly connected to the low resistance conductive film by a conductive material in a near proximity to each of sides of the drive circuits facing each other.

8. A display device according to claim 1, wherein the terminal of the drive circuit connected to the line terminal through the transparent conductive film is formed in a near proximity to a side of the drive circuit close to the display area.

9. A display device according to claim 1, wherein the external terminal is formed in an area between the drive circuit and the adjacent drive circuit.

10. A display device according to claim 1, wherein the external terminal is connected directly to an external unit by a conductive material formed in the same step as the conductive material used for connecting the terminals of the drive circuit mounted directly in the insulating substrate to the line terminal and to the external line terminal.

11. A method of manufacturing a display device including lines connected to pixels formed on an insulating substrate, a lead line connected to at least one of the lines in a peripheral area of the insulating substrate different from a display area comprising the pixels, an external terminal formed on a periphery of the peripheral area of the insulating substrate, to be connected to an external unit, and an external line connected to at least one of the external terminal, comprising the steps of:
 forming an external line terminal connected to at least one of the external line by depositing and patterning a low resistance conductive film;
 forming a line terminal connected to at least one of the lead line in the peripheral area of the insulating substrate by depositing and patterning a high resistance conductive film;
 forming a transparent conductive film on the line terminal;
 forming a anisotropie conductive film on the transparent conductive film;
 connecting the line terminal and a terminal of a drive circuit mounted in the insulating substrate by the anisotropic conductive material through a transparent conductive film; and
 connecting the external line terminal and a terminal of the drive circuit by the anisotropic conductive material.

12. A method of manufacturing a display device according to claim 11, wherein the high resistance conductive film is a selected one of Cr, Ti, Ta, Mo, W, Ni, an alloy of those metals, and a laminated film of those metals, and the low resistance conductive film is a selected one of Al, Cu, Au, Ag, an alloy of those metals, and a laminated film of those metals.

13. A method of manufacturing a display device according to claim 11, wherein the high resistance conductive film is a selected one of Cr, Ti, Ta, Mo, W, Ni, an alloy of those metals, and a laminated film of those metals, and the low resistance conductive film is a selected one of Al and an alloy of Al.

14. A method of manufacturing a display device according to claim 11, wherein the external line and the external line terminal are formed in the same step as forming a scan line for driving the pixels.

15. A method of manufacturing a display device according to claim 11, wherein the lead line and the line terminal are formed in the same step as forming a signal line crossing a scan line for driving the pixels through an insulating film.

16. A method of manufacturing a display device according to claim 11, wherein the transparent conductive film is formed in the same step as forming a pixel electrode of the pixel.

17. A method of manufacturing a display device according to claim 11, further comprising a step of connecting a terminal of the drive circuit and a terminal of an adjacent drive circuit in such a way that each of the terminals is directly connected to the low resistance conductive film by a conductive material in a near proximity to each of sides of the drive circuits facing each other.

18. A method of manufacturing a display device according to claim 11, wherein the external terminal is connected directly to an external unit by a conductive material formed in the same step as the conductive material used for connecting the terminals of the drive circuit mounted directly in the insulating substrate to the line terminal and to the external line terminal.

19. A display device according to claim 1, wherein the terminal of the drive circuit connected to the line terminal by the conductive material through the transparent conductive film and the terminal of the drive circuit connected directly to the external line terminal by the conductive material have a difference in height, which is substantially equal to a difference in height of the transparent conductive film on the line terminal, and the external line terminal, formed above the insulating substrate and connected respectively to the terminals of the drive circuit.

* * * * *